US012698391B2

(12) United States Patent
Xing et al.

(10) Patent No.: US 12,698,391 B2
(45) Date of Patent: Aug. 4, 2026

(54) PREPARATION OF DEGRADABLE POLYESTER COMPOSITES AND USE THEREOF

(71) Applicants:CNPC USA CORPORATION, Houston, TX (US); Beijing Huamei, Inc., Beijing (CN); China National Petroleum Corporation, Beijing (CN)

(72) Inventors: Peixiang Xing, Houston, TX (US); Jiaxiang Ren, Houston, TX (US); Peng Cheng, Sugard Land, TX (US)

(73) Assignees: CNPC USA CORPORATION, Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 732 days.

(21) Appl. No.: 18/054,842

(22) Filed: Nov. 11, 2022

(65) Prior Publication Data

US 2023/0399506 A1 Dec. 14, 2023

Related U.S. Application Data

(60) Provisional application No. 63/351,424, filed on Jun. 12, 2022.

(51) Int. Cl.
*C08L 67/02* (2006.01)
*C08K 3/22* (2006.01)

(52) U.S. Cl.
CPC ............... *C08L 67/02* (2013.01); *C08K 3/22* (2013.01); *C08K 2003/2206* (2013.01); *C08K 2003/2224* (2013.01); *C08K 2003/2227* (2013.01); *C08L 2201/06* (2013.01)

(58) Field of Classification Search
None
See application file for complete search history.

(56) References Cited

U.S. PATENT DOCUMENTS

| | | | |
|---|---|---|---|
| 4,189,422 A | 2/1980 | Wakeford | |
| 7,661,481 B2 | 2/2010 | Todd | |
| 8,276,670 B2 | 10/2012 | Patel | |
| 8,901,224 B2 | 12/2014 | Feichtinger | |
| 9,260,935 B2 | 2/2016 | Murphree | |
| 2008/0090954 A1 | 4/2008 | Sumner et al. | |
| 2010/0133088 A1 | 6/2010 | Hajek | |
| 2013/0253145 A1* | 9/2013 | Sakai ................. C08G 63/6886 |
| | | | 525/444 |
| 2014/0360728 A1* | 12/2014 | Tashiro .................. C09K 8/805 |
| | | | 166/305.1 |
| 2016/0122908 A1 | 5/2016 | Qiao et al. | |
| 2016/0148725 A1 | 5/2016 | Flory et al. | |
| 2016/0281454 A1 | 9/2016 | Zhu | |
| 2017/0175479 A1 | 6/2017 | Lesko | |
| 2017/0369708 A1 | 12/2017 | Kokel | |
| 2018/0252082 A1 | 9/2018 | Zhu | |
| 2019/0119488 A1 | 4/2019 | Guha et al. | |
| 2020/0032010 A1* | 1/2020 | Liao ......................... C08K 7/14 |
| 2021/0054155 A1 | 2/2021 | Gallucci et al. | |

FOREIGN PATENT DOCUMENTS

| | | |
|---|---|---|
| WO | 1991009004 | 6/1991 |
| WO | 2021119372 A | 6/2021 |

OTHER PUBLICATIONS

Li et al. (Macromol. Mater. Eng. 2022, 307, 2100832) (Year: 2022).*
International Search Report for PCT/US22/79734, Mailed on Apr. 10, 2023.

* cited by examiner

*Primary Examiner* — Robert T Butcher
(74) *Attorney, Agent, or Firm* — Frank Gao, Esq.

(57) ABSTRACT

The polyester based polymer composition includes a polyester, a metal oxide, and a metal hydroxide. The polymer composites contains the metal oxide and a metal hydroxide made from melting blending has good mechanical property as well as greater degradability after a required time in the higher temperatures and moisture of downhole conditions. The reinforced polymer composites with glass fibers, and the metal oxide and metal hydroxide made from melting blending has higher mechanical property as well as greater degradability after a required time in the higher temperatures and moisture of downhole conditions. The polymer composites made from melting blending have the required mechanical properties and the degradability so that the polymer composites can be used for degradable or dissolvable component of a downhole tool.

5 Claims, 7 Drawing Sheets

| Time | 0 day | 4 hrs | 8 hrs | 2 days |
|------|-------|-------|-------|--------|
| specimen | | | | |

PET/GF/CaO/Ca(OH)₂ 60/30/5/5 before degradation

PET/GF/CaO/Ca(OH)₂ 60/30/5/5  18 days degraded

PREPARATION OF DEGRADABLE POLYESTER COMPOSITES AND USE THEREOF

CROSS-REFERENCE TO RELATED APPLICATIONS

This patent application claims the benefit of priority, under 35 U.S.C. Section 119(e), to U.S. Provisional Patent Application Ser. No. 63/351,424 entitled "POLYESTER BASED POLYMER COMPOSITION FOR DEGRADABLE COMPOSITE MATERIALS", filed on Jun. 12, 2022.

BACKGROUND OF THE INVENTION

1. Field of the Invention

The present invention relates to degradable composite materials that can be used to form components of downhole tools. More particularly, the present invention relates to a polymer composition as matrix in the degradable composite material.

2. Description of Related Art Including Information Disclosed Under 37 CFR 1.97 and 37 CFR 1.98

Downhole tools are commonly used in oil and gas production. The plugs close and open portions of the borehole so that a zone of ground formation can be isolated. A sleeve opens and closes to make the fluid connection between the borehole and the ground formation. The downhole tools work to isolate and connect the zone for various operations to prepare and produce the hydrocarbons from the ground formation. When the operations are complete in the zone, components of the downhole tool or even the entire downhole tool may require removal. For example, a dissolvable frac ball set in a plug to trigger a seal may be removed by injecting a solvent targeted to the dissolvable frac ball so that the seal is removed. Alternatively, the entire plug may be removed.

Degradable or dissolvable composite materials are developed for the manufacture of downhole tool components in the oil and gas industry. Materials other than metal can be used for downhole tools. For the oil and gas industry, composite materials have been developed to withstand the extreme environmental conditions, like high temperatures and pressures. These composite materials must also be able to function according to application requirements for downhole tools with regard to mechanical strength, flexibility, thermal expansion, etc. A degradable or dissolvable downhole tool can have both metal and composite material components, and both types of components should be degradable, disintegrated or dissolvable for removal.

Polymer compositions are known for use as a matrix in polymer composite materials. The complication has been degrading, disintegrating or dissolving the polymer composition in a controlled manner as a strong, flexible and durable component for the time and temperatures required of a downhole tool. For example, a polyester based polymer, such as polyethylene terephthalate (PET), degrades or hydrolyzes extremely slowly at room temperature or lower. Even at moderately elevated temperatures (e.g. 90° C.), the degradation or hydrolytic degradation is still slow. There are known factors that can accelerate the hydrolytic degradation of PET: temperature and moisture, and acidity/alkalinity. At the higher temperatures and moisture of downhole conditions, the degradation is accelerated, relative to degradation at room temperature conditions. A downhole tool component made of PET would be exposed to these higher temperatures and moisture of downhole conditions. The acceleration must be controlled so that component of the downhole tool can still function for the required time (mainly for fluids frac) at the higher temperatures and moisture of downhole conditions.

Additionally, there is an incorporation of an acid or base additive in the prior art. However, the acid or base additive further degrades the PET during formulation, processing and molding so that the PET is less able to maintain the mechanical performance for the required time at the higher temperatures and moisture of downhole conditions. The manufacturing process is also tenuous because some base additives, like metal hydroxides, induce degradation (such as chain scission of an ester group) of the PET during melt blending or melt mixing with PET. As a polymer composition, the PET with modified acidity/alkalinity by melt blending or melt mixing is not stable enough and not reliable to function as the component of the downhole tool.

The component of composite material should have the strength, flexibility, and durability to function as a downhole tool component. As a known additive to a polymer composition of a composite material, the melt blended with calcium oxide has been unable to meet the performance required for the required time at the higher temperatures and moisture of downhole conditions. Adding calcium oxide by melt blending makes the polymer composition degradable or dissolvable, but the amount of calcium oxide has been limited by the need to meet performance standards for a downhole tool component. Thus, the rate of dissolving or degrading has similarly been limited by the amount of calcium oxide. There is no control over the rate of dissolving or degrading since the amount of calcium oxide are already limited by the required time at the higher temperatures and moisture of downhole conditions.

Degradable materials can change their mechanical, physical and responsive properties upon thermal, hygroscopic, and/or chemical interaction with their environment, or upon interaction with mechanical, physical or chemical triggers. Degradable materials provide acceptable performance for a certain period of time and after fulfilling their intended applications, the materials degrade or dissolve away in the downhole environment, which saves both time and cost which is associated with drilling out or retrieving nondegradable materials. Degradable materials are of particular interest to the oil field industry especially because of this efficient and short operation turnaround time and related cost saving potential.

It is an object of the present invention to provide a polymer composition for a degradable composite material.

It is an object of the present invention to provide a polyester based polymer composition for a degradable composite material.

It is an object of the present invention to provide a polymer composition as a dissolvable matrix of a composite material.

It is an object of the present invention to provide a dissolvable or degradable polymer composition by melt blending.

It is another object of the present invention to provide a modified polyester based polymer composition for a dissolvable or degradable polymer composite material that maintains performance standards for a downhole tool.

It is another object of the present invention to provide a modified polyester based polymer composition for a composite material for a downhole tool with a controlled rate of dissolving.

It is still another object of the present invention to provide a modified polyester based polymer composition for a composite material for a downhole tool with greater dissolvability.

It is still another object of the present invention to provide a modified polyester composition reinforced with glass fibers for a composite material for a downhole tool with greater dissolvability.

These and other objectives and advantages of the present invention will become apparent from a reading of the attached specification.

BRIEF SUMMARY OF THE INVENTION

The present invention discloses a polyester based polymer composition that keeps mechanical properties while increasing the rate of degradation so as to be compatible for components of downhole tools. In particular, embodiments of the present invention have a rate of degradation of less than 20% weight retention after 2 days at 90 degrees Celsius in 1.0% KCl. The polymer composition of the present invention is formed by melt blending or melt mixing.

Embodiments of the present invention include the degradable composite material itself, comprising a reinforcement element at 20-50% by weight and a polymer composition at 50-80% by weight. The reinforcement element can be structural, like fibers or beads, and the fibers or beads can be made of glass, nanotubes, or graphenes. The polymer composition comprises the polyester, metal oxide, and metal hydroxide. The degradable composite material has mechanical properties suitable for components of downhole tools for the required time at the higher temperatures and moisture of downhole conditions.

In one embodiment, a degradable composite comprises about 20-70% by weight of polyester, about 4-30% by weight of a metal oxide, and a metal hydroxide, and about 0-50% by weight of fiber, wherein the composite has a tensile strength of at least about 80-100 MPa.

In another embodiment, a method of manufacturing a degradable composite, comprising steps of melt extrusion of mixture of a polyester, metal oxide, metal hydroxide, or/and glass fibers with single screw extruder or twin screw extruder. The extruded compounded composites formed evenly distributed composite.

In further another embodiment, a degradable composite may comprise polyester; a metal oxide, and a metal hydroxide, and fiber, wherein the composite has a tensile strength of at least about 90 MPa.

In any optional embodiment, the polyester is about 30-70% by weight of the composite.

In any optional embodiment, the metal oxide is about 2-25% by weight of the composite.

In any optional embodiment, the metal hydroxide is about 2-15% of the composites.

In any optional embodiment, the fiber is about 10-50% of the composites.

In any optional embodiment, the polyester is polyethylene terephthalate (PET).

In any optional embodiment, the polyester is polyethylene naphthalate (PEN).

In any optional embodiment, the metal oxide is calcium oxide, or magnesium oxide, or aluminum oxide.

In any optional embodiment for the method of manufacture, the mixture further comprises fiber.

In any optional embodiment, the metal hydroxide is calcium hydroxide, magnesium hydroxide, or aluminum hydroxide.

DETAILED DESCRIPTION OF THE INVENTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly Indicates otherwise (for example "including", "having" and "comprising" typically indicate "including without limitation"). Singular forms included in the claims such as "a", "an" and "the" include the plural reference unless expressly stated otherwise. All relevant references, including patents, patent applications, government publications, government regulations, and academic literature are hereinafter detailed and incorporated by reference in their entireties. In order to aid in the understanding and preparation of the within invention, the following illustrative, non-limiting, examples are provided.

The terms "wt. %" or "% by weight" refer to the weight percent of a component in the composite formulation with respect to the weight of the whole composite formulation.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by "about" includes the variation and degree of care typically employed in measuring in a plant or lab producing a material or polymer. For example, the amount of a component of a product when modified by "about" includes the variation between batches in a plant or lab and the variation inherent in the analytical method. Whether or not modified by about, the amounts include equivalents to those amounts. Any quantity stated herein and modified by "about" can also be employed in the present invention as the amount not modified by about. The term "about" means plus or minus 20%, more preferably plus or minus 10%, even more preferably plus or minus 5%, most preferably plus or minus 2%.

A component of composite materials must have the strength, flexibility, and durability to function as a downhole tool component. These mechanical performance standards must be maintained for the required time at the higher temperatures and moisture of downhole conditions to prevent failure of the tool. The component must also remain dissolvable or degradable once the required time has passed. The rate of dissolving or degrading must be controlled to both last the required time and quickly dissolve or degrade after the required time.

Figures 1, 2:
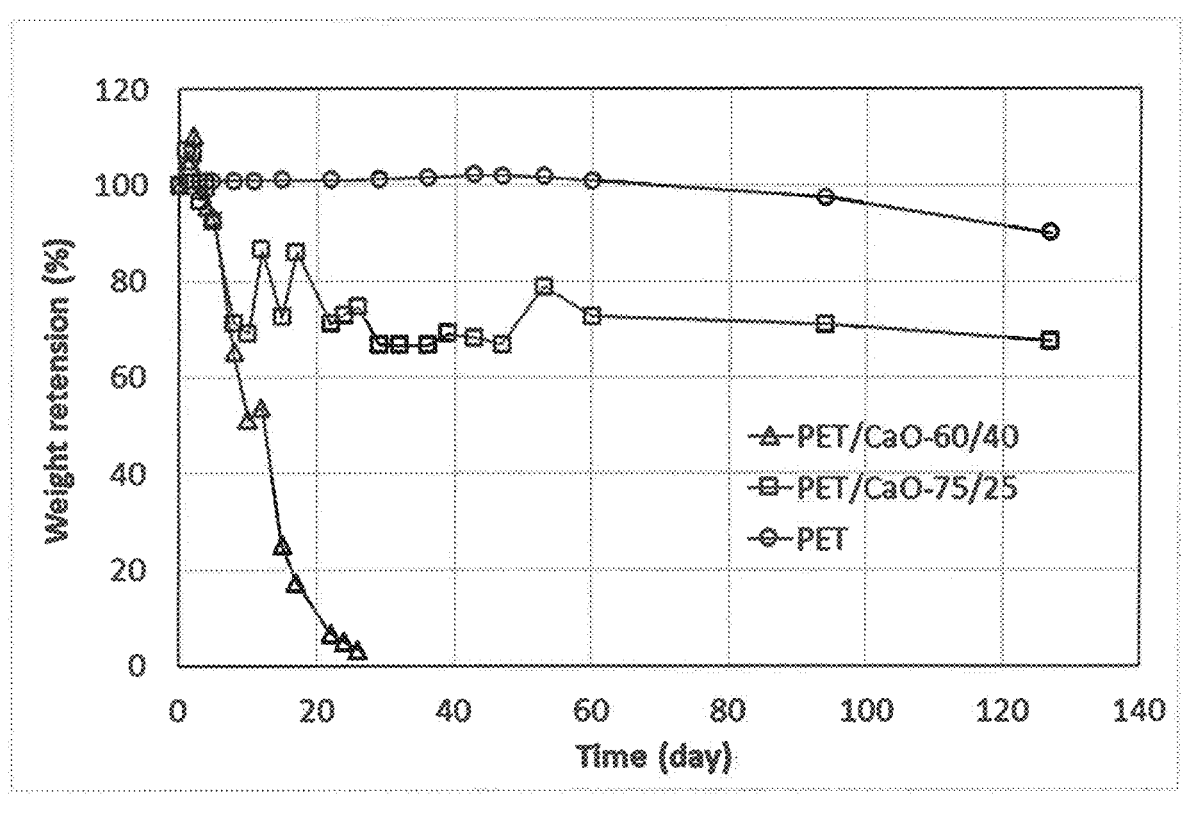
FIG. 1 is a graph illustration of degradation at 90 degrees Celsius in 0.3% KCl for polymer compositions of polyester and metal oxide.
FIG. 2 are photo illustrations of degradation at 90 degrees Celsius in 1.0% KCl for a polymer composition of the present invention.

FIG. 1 and FIG. 2 show polymer compositions and embodiments of the polymer composition of the present invention. The polymer composition is a matrix for a degradable composite material that can be used to make components of a downhole tool. The polymer composition comprises polyester, a metal oxide, and a metal hydroxide. The polyester comprises polyethylene terephthalate (PET) or polybutylene terephthalate (PBT) or polyethylene naphthalate (PEN), for example. The metal oxide comprises calcium oxide, magnesium oxide, or aluminum oxide, for example. The metal hydroxide comprises calcium hydroxide, magnesium hydroxide, or aluminum hydroxide, for example.

The polyester can be 60-100% by weight of the polymer composition, and the metal oxide can be 0-40% by weight of the polymer composition in order to keep mechanical properties of the performance standard.

FIG. 1 shows degradation at 90 degrees Celsius in 0.3% KCl. The degradation is hydrolytic degradation of polymer composition samples at 90 degrees Celsius in 0.3% KCl. All three samples are made by melt blending. Sample polyester PET is the baseline polyester. There is 100% PET. The rate of degradation or rate of dissolution is the slowest. There is less than 80% weight retention, even after 120 days. The prior art polymer composition is still dissolvable and still useable as a component of a downhole tool, but the downhole tool must account for the slow rate of dissolving. The performance standard lasts for the required time at the higher temperatures and moisture of downhole conditions, but the rate of dissolving is too slow after the required time. Only particular components and particular situations would be compatible for this prior art composition.

Sample PET/CaO=60/40 of FIG. 1 is the prior art composition of polyester and calcium oxide. There is 60% PET, 40% CaO and 0% metal hydroxide. The rate of degradation or rate of dissolution is much faster with the metal oxide. There is less than 20% weight retention after 20 days. Additionally, this fast rate of degradation sacrifices the mechanical properties for performance standards. Table 1 indicates that the tensile strength may be too low to be useable as most downhole tool components. The strain at break is also shown. The prior art polymer composition is dissolvable and still useable as a component of a downhole tool, but the downhole tool must account for borderline mechanical properties. The mechanical performance standard can last for the required time at the higher temperatures and moisture of downhole conditions, but the required time must be very short. Only particular components and particular situations would be compatible for this prior art composition.

Sample PET/CaO=75/25 of FIG. 1 is another prior art composition of polyester and calcium oxide. There is about 75% PET, about 25% CaO and about 0% metal hydroxide. The rate of degradation or rate of dissolution is a middle ground. There is less than 80% weight retention after 20 days. However, the weight retention remains over 60% after 120 days. Sample PET/CaO=75/25 shows that lowering the amount of metal oxide to change the rate of degradation is limited. The range is between about 10-40% by weight. Lowering from 40% to 25% increases the mechanical properties for performance standards and increases the rate of degradation, but these prior art compositions cannot be lowered indefinitely to increase the rate of degradation as needed. The rate of degradation is still too slow with over 60% weight retention after 120 days at 90 deg C. Changing the amount of metal oxide has limited control on the rate of dissolving.

Sample PET/CaO/Ca(OH)$_2$ of FIG. 2 is about 75% PET, about 20% CaO and about 5% metal hydroxide, such as calcium hydroxide, for example. The rate of degradation or rate of dissolution is faster than sample PET/CaO=75/25 of FIG. 1. There is less than 20% weight retention after 2 days at 90 degrees Celsius in 1.0% KCl. The faster rate of degradation is achieved without lowering the amount of metal oxide. Since the amount of metal oxide is not lowered to increase the rate of degradation, the mechanical properties remain stable with melt blending. (compound A3 in Table 1)

Table 1 shows mechanical properties of polyester based polymer compositions of the prior art and the present invention for comparison. The polyester is polyethylene terephthalate (PET), and the additive is calcium oxide (CaO). These polymer composites can be made by melt blending as in Table 1.

TABLE 1

| Prior Art and Present Invention Mechanical Properties | | |
| --- | --- | --- |
| Sample name | Formula | Tensile Strength (MPa) |
| A1 | PET (Prior art) | 51 |
| A2 | PET/CaO 75/25 (Prior art) | 57 |
| A3 | PET/CaO/Ca(OH)$_2$ 75/20/5 | 53 |
| A4 | PET/CaO/Ca(OH)$_2$ 73/20/7 | 45 |
| A5 | PET/CaO/Ca(OH)$_2$ 60/20/20 | 20 |

The PET (100% PET) and PET/CaO 75/25 (about 75% PET, about 25% CaO) are prior art compositions consistent with Table 1 and FIG. 1. The rate of degradation remains at issue.

Sample PET/CaO/Ca(OH)$_2$ 60/20/20 comprises 60% PET, 20% CaO and 20% Ca(OH)$_2$, showing the loss of mechanical properties.

However, Sample PET/CaO/Ca(OH)$_2$ 73/20/7 comprises about 73% PET, about 20% CaO and about 7% Ca(OH)$_2$.

The mechanical properties are confirmed again for the higher amount of alkaline additive. Adding more $Ca(OH)_2$ is not fatal, as taught in the prior art. The present invention discloses the innovation of a polyester based polymer composition that keeps mechanical properties for performance standards for the required time at higher temperatures and moisture of downhole conditions, while the rate of degradation after the required time is sufficiently fast so as to be compatible for components of downhole tools that require faster rate of degradation at less than 20% weight retention after 2 days at 90 degrees Celsius in 1.0% KCl.

TABLE 2 prior art and present invention mechanical properties

| Sample name | Formula | Tensile Strength (MPa) | Strain at break (%) |
|---|---|---|---|
| A6 | PET/Ca(OH)$_2$ 90/10 | 2.4 | 0.1 |
| A7 | PET/CaO/Ca(OH)$_2$ 80/10/10 | 41.1 | 3.0 |
| A8 | PET/CaO/Ca(OH)$_2$ 90/5/5 | 50.7 | 5.8 |

From Table 2, sample PET/Ca(OH)$_2$ 90/10 (90% PET, 10% Ca(OH)$_2$) is prior art composition with calcium hydroxide as the alkaline additive with melt blending. The PET/Ca(OH)$_2$ 90/10 (90% PET, 10% Ca(OH)$_2$) has a tensile strength of only 2.4 MPa. This very low tensile strength indicates severe degradation during melting blending. The metal hydroxide additive is not compatible with a polymer composition of a degradable polymer composite material of a downhole tool. The polymer composition with only metal hydroxide is not mechanically strong enough, regardless of rate of dissolving. Having such low strength, the rate of dissolving would be too fast, even if the polymer composition would last for the required time in downhole conditions.

Sample PET/CaO/Ca(OH)$_2$ 80/10/10 (80% PET, 10% CaO, 10% Ca(OH)$_2$) and sample PET/CaO/Ca(OH)$_2$ 90/5/5 (90% PET, 5% CaO, 5% Ca(OH)$_2$) in Table 2 show that a metal oxide and along with alkaline additive together are impregnated with a polymer composition for a degradable polymer composite. Sample PET/CaO/Ca(OH)$_2$ 80/10/10 (80% PET, 10% CaO, 10% Ca(OH)$_2$) has a tensile strength 41.1 MPa, and sample PET/CaO/Ca(OH)$_2$ 90/5/5 (90% PET, 5% CaO, 5% Ca(OH)$_2$) has a tensile strength 50.7 MPa. The melt blending with metal hydroxide was previously incompatible and show only tensile strength 2.4 MPa (A6). The present invention shows that certain compositions melt blended with calcium hydroxide with adding calcium oxide together can be made with improved mechanical properties potentially for of downhole conditions.

Samples PET composites with reinforcement glass fiber in Table 3 show that big improvement in tensile strength with reinforced with glass fibers. The sample AR-1 (PET/glass fiber/CaO/Ca(OH)$_2$ 60/30/0/10) (60% PET melt blended with 30% glass fiber and 10% Ca(OH)$_2$) show the tensile strength 52 MPa. But with adding 10% CaO and 10% Ca(OH)$_2$ together, the AR-2 (PET/glass fiber/CaO/Ca(OH)$_2$ 50/30/10/10) (50% PET melt blended with 30% glass fiber, 10% CaO and 10% Ca(OH)$_2$ in the formulation) show dramatic improvement in tensile strength with tensile strength 95 MPa (about 80% enhancement comparing with AR-1), This result is in consistent with the finding with PET melt blend without glass fiber (in Table 3). Similarly, The AR-3 (PET/glass fiber/CaO/Ca(OH)$_2$ 60/30/5/5) (60% PET melt blended with 30% glass fiber, 5% CaO and 5%

Ca(OH)$_2$ in the formulation) show dramatic improvement in tensile strength with tensile strength 102 MPa (about 95% enhancement comparing with AR-1). The present invention shows that certain compositions melt blended with calcium hydroxide with adding calcium oxide together can be made with the enhanced mechanical performance for the required time at the higher temperatures and moisture of downhole conditions.

TABLE 3

Mechanical properties of polymer (PET) composites reinforced with glass fibers

| Sample name | Formula | Tensile Strength (MPa) | Strain at break (%) |
|---|---|---|---|
| AR-1 | PET/Glass Fiber/CaO/Ca(OH)$_2$ 60/30/0/10 | 52 | 1.7 |
| AR-2 | PET/Glass Fiber/CaO/Ca(OH)$_2$ 50/30/10/10 | 95 | 3 |
| AR-3 | PET/Glass Fiber/CaO/Ca(OH)$_2$ 60/30/5/5 | 102 | 3 |

Another polyester sample Polyethylene naphthalate (PEN) with reinforcement glass fiber in Table 4 show that big improvement in tensile strength with reinforced with glass fibers. The sample BR-1 (PEN/glass fiber/CaO/Ca(OH)$_2$ 60/30/0/10) (about 60% PEN melt blended with about 30% glass fiber and about 10% Ca(OH)$_2$) show the tensile strength 88 MPa. But with adding about 10% CaO and about 10% Ca(OH)$_2$ together, the BR-2 (PEN/glass fiber/CaO/Ca(OH)$_2$ 50/30/10/10) (about 50% PEN melt blended with about 30% glass fiber, about 10% CaO and about 10% Ca(OH)$_2$ in the formulation) show big improvement in tensile strength with tensile strength 122 MPa (about 38% enhancement comparing with BR-1), This result is in consistent with the finding with polyester PET melt blend without glass fiber (in Table 2). Similarly, The BR-3 (PEN/glass fiber/CaO/Ca(OH)$_2$ 60/30/5/5) (60% PEN melt blended with 30% glass fiber, 5% CaO and 5% Ca(OH)$_2$ In the formulation) show dramatic improvement in tensile strength with tensile strength 139 MPa (about 58% enhancement comparing with BR-1. These results are similar finding for reinforced PET composites in the Table 4. The BR-3 also degraded into pieces from the size of ASTM D613 tensile bar within 4 to 7 days at 0.3% KCl solution and at 150° C. The present Invention shows that certain compositions melt blended with calcium hydroxide with adding calcium oxide together can be made with the enhanced mechanical performance for the required time at the higher temperatures and moisture of downhole conditions.

TABLE 4

Mechanical properties of polymer (PEN) composites reinforced with glass fibers

| Sample name | Formula | Tensile Strength (MPa) | Strain at break (%) |
|---|---|---|---|
| BR-1 | PEN/Glass Fiber/CaO/Ca(OH)$_2$ 60/30/0/10 | 88 | 2.4 |
| BR-2 | PEN/Glass Fiber/CaO/Ca(OH)$_2$ 50/30/10/10 | 122 | 3.1 |
| BR-3 | PEN//Glass Fiber/CaO/Ca(OH)$_2$ 60/30/5/5 | 139 | 4.9 |

Embodiments of the present invention further include the degradable composite material itself, comprising a reinforcement element at about 20-50% by weight and a matrix composition at about 50-80% by weight. The reinforcement element can be structural, like fibers or beads, and the fibers or beads can be made of glass, nanotubes, or graphenes. The structural reinforcement element has mechanical properties at the performance standard for components of downhole tools, just as the matrix composition must also have mechanical properties at the performance standard for components of downhole tools. The matrix composition comprises the polyester based polymer composition with polyester, metal oxide, and metal hydroxide.

The present invention provides a polymer composition for a degradable composite material. The composition is based on a polyester, like PET, or like PEN. The polymer composition is the matrix to be mixed with a reinforcement element, like glass fibers or carbon fibers, or other fibers to form the degradable composite material. The degradable composite also contains the metal oxide and metal hydroxide. The polymer matrix (contains metal oxide and metal hydroxide) is dissolvable or degradable so that the composite material is also degradable. As the polymer matrix dissolves, the structural reinforcement elements no longer hold together.

The present invention is formed by melt blending. The mechanical properties of the polymer composition have the tensile strength to meet the performance for a required time at the higher temperatures and moisture of downhole conditions. The polymer composition of the present invention also has an accelerated degradation or dissolving. The hydrolytic degradation of the polymer composition is controlled in the present invention, and the mechanical properties are maintained for the required time, even with melt blending with metal hydroxide. The modified polyester based polymer composition has greater degradability after the required time in the downhole conditions while maintaining mechanical properties with a melt blended metal hydroxide.

The foregoing disclosure and description of the invention is illustrative and explanatory thereof. Various changes in the details of the illustrated structures, construction and method can be made without departing from the true spirit of the invention.

Experiment

Experimental 1.1

Materials Calcium oxide powders (SKU #C0892-500G) manufactured by Aqua solutions (Deer Park, TX 77536) were obtained from Sigma-Aldrich. The average diameter of CaO powders was measured to be 1.5 µm using an optical microscope. Calcium hydroxide was obtained from Sigma-Aldrich. Fiber/extrusion grade PET pellets of IV 0.83 were obtained from the former Kosa Company (now part of the Invista Company). Chopped glass fibers (E-glass, Grade 534A) of diameter 10 µm and length 4.5 mm were supplied by Jushi Inc. From Jushi's material data sheet, 534A chopped glass fibers are specifically designed for polybutylene terephthalate (PBT) and PET.

TABLE 5

PET composites with glass fiber, CaO, and $Ca(OH)_2$ at various compositions.

| Tensile Properties Composites | Name | PET % | GF % | CaO % | $Ca(OH)_2$ % | Tensile strength, MPa | Strain at break, % |
|---|---|---|---|---|---|---|---|
| #1 (AR-2) | PET/GF/CaO/$Ca(OH)_2$ 50/30/10/10 | 50 | 30 | 10 | 10 | 95.4 | 4.0 |
| #2 (AR-1) | PET/GF/CaO/$Ca(OH)_2$ 60/30/0/10 | 60 | 30 | 0 | 10 | 52.1 | 1.7 |
| #3 | PET/GF/CaO/$Ca(OH)_2$ 50/30/15/5 | 50 | 30 | 10 | 10 | 108.3 | 3.3 |
| #4 (AR-3) | PET/GF/CaO/$Ca(OH)_2$ 60/30/5/5 | 60 | 30 | 5 | 5 | 102.2 | 3.0 |
| #5 | PET/GF/CaO/$Ca(OH)_2$ 80/0/10/10 | 80 | 0 | 10 | 10 | 41.1 | 3.0 |
| #6 | PET/GF/CaO/$Ca(OH)_2$ 80/0/15/5 | 80 | 0 | 10 | 10 | 55.9 | 6.7 |
| #7 | PET/GF/CaO/$Ca(OH)_2$ 90/0/0/10 | 90 | 0 | 0 | 10 | 2.4 | 0.1 |
| #8 | PET/GF/CaO/$Ca(OH)_2$ 90/0/5/5 | 90 | 0 | 5 | 5 | 50.7 | 5.9 |

TABLE 6

PEN composites with glass fiber, CaO, and $Ca(OH)_2$ at various compositions.

| Tensile Properties Composites | Name | PEN % | GF % | CaO % | $Ca(OH)_2$ % | Tensile strength, MPa | Strain at break, % |
|---|---|---|---|---|---|---|---|
| #1 | PEN/GF/CaO/$Ca(OH)_2$ 70/30/0/0 | 70 | 30 | 0 | 0 | 142.9 | 6.1 |
| #2 (BR-#1) | PEN/GF/CaO/$Ca(OH)_2$ 60/30/0/10 | 60 | 30 | 0 | 10 | 88.7 | 2.5 |
| #3 (BR-#2) | PEN/GF/CaO/$Ca(OH)_2$ 50/30/10/10 | 50 | 30 | 10 | 10 | 122.3 | 3.1 |

TABLE 6-continued

| | | | | | | Tensile | |
|---|---|---|---|---|---|---|---|
| Tensile Properties Composites | Name | PEN % | GF % | CaO % | Ca(OH)$_2$ % | strength, MPa | Strain at break, % |
| #4 (BR-#3) | PEN/GF/CaO/Ca(OH)$_2$ 60/30/5/5 | 60 | 30 | 5 | 5 | 139 | 4.9 |
| #5 | PEN/GF/CaO/Ca(OH)$_2$ 50/30/5/15 | 50 | 30 | 5 | 15 | 102.7 | 2.4 |
| #6 | PEN/GF/CaO/Ca(OH)$_2$ 65/15/10/10 | 65 | 15 | 10 | 10 | 107.6 | 5.2 |
| #7 | PEN/GF/CaO/Ca(OH)$_2$ 90/0/0/10 | 90 | 0 | 0 | 10 | 74.1 | 10.8 |
| #8 | PEN/GF/CaO/Ca(OH)$_2$ 80/0/10/10 | 80 | 0 | 10 | 10 | 75.7 | 8.8 |

PEN composites with glass fiber, CaO, and Ca(OH)$_2$ at various compositions.

1.2 Processing

The PET/CaO and PET/CaO/Ca(OH)$_2$ Composite materials were processed by melt mixing using a batch mixer followed by compression molding between two heated platens. (Table 1) The details of processing are elaborated below.

The other composites from Table 2 to Table 6 were processed by extrusion compounding, pelletizing. Then tensile bars and flex bars were molded with injection molding. The details of processing are elaborated below and in Table 7.

1.2.1 Drying

Drying is critical for PET melt processing. If a significant level of moisture is contained, PET is known to undergo rapid thermal degradation/hydrolysis at its melt processing temperature (above 260° C.). The typical protocol for drying PET and PEN pellets is 4 hours at 140° C. In the actual experiments, a longer drying process, 24 hours at 140° C. in a convective oven, was used to ensure more stringent moisture removal requirement for batch mixing since batch mixing is a longer process compared with the typical industrial practice by twin-screw compounding. Calcium oxide and calcium hydroxide powders were dried at 500° C. for 4 hours in a convective furnace.

The moisture content of dried materials was measured using the MAX 4000XL moisture analyzer before processing to ensure the moisture level below the recommended value. Both PET and PEN composites were dried to below 0.04% moisture content.

1.2.2 Melt Mixing

Mixing of samples were performed on a batch mixer (C.W. Brabender Prep-Center fitted with twin roller blades). The mixing temperature was fixed at 280° C., about 25° C. above the nominal melting temperature of PET. During mixing, CaO or CaO+Ca(OH)$_2$ powders were first added to the mixing bowl preheated to 280° C. PET pellets were then added to the hot mixing bowl at a rotor RPM of approximately 10. Filling the bowl with PET usually took about 10-15 minutes (a good PET melt usually forms after 15 minutes). The total mixture was then left inside the mixing bowl running at an RPM of 15 for another 5 to 10 minutes (denoted as the mixing time) before the bowl was opened for removal of the mixture. In the following text of this patent application, the mixing time was defaulted to be 5 minutes if not otherwise noted.

1.2.3 Compression Molding

Compression molding was conducted on a Carver press (Model: #4389 MOD-M) installed with a pair of 9" by 9" heated platens. The mold used has a 4" by 4" square cavity of ¹⁄₁₆" thickness. Teflon sheets are used to separate the mold cavity from the heated platens, for easy releasing during mold opening. The compression molding temperature is set to 280° C., same as that in batch mixing. The materials obtained from batch mixing are not very regular in sizes and shapes. Care must be taken to place the material inside the mold cavity so that a complete plaque is properly molded without large overflow outside the mold. Pressure is slowly added as the material is being melted to eliminate the air pore inside the structure of PET/CaO or PET/CaO/Ca(OH)$_2$ composites; basically, no suddenly increased force is allowed in the entire compression molding cycle. When the two platens come in contact, the pressure rapidly increases. The machine is left at a compression force of about 15 tons for another 5 minutes. The mold is then removed from the hot plates and cooled under load at room condition. When the entire molding is cooled below the glass transition temperature (Tg) of PET, the mold is opened to harvest the molded square plaque.

For Table 2 to Table 6, the melt blending (compounding) could be extruded with twin extruder Leistritz ZSE-27. For PET composites compounding, the temperatures at different zones are ranging from 200° C. to 270° C. with 200 RPM. The temperature profiles were adjusted according to different formulations. The polymer resin (PET) and glass fiber were dried prior to the melt extrusion. The extruded composites filaments were immediately pelletized into pellets for further use in injection molding. For PEN composites compounding, the temperatures at different zones are ranging from 260° C. to 278° C. with 200 RPM. The temperature profiles were adjusted according to different formulations. The polymer resin (PEN) and glass fiber were dried prior to the melt extrusion. The extruded composites filaments were immediately pelletized into pellets for further use in injection molding.

Injection Molding

For Table 2 to Table 6, Injection molding was conducted on a Toyo Plastar machine. The compounded PET composites pellets or PEN composites pellets were dried to moisture level below 0.025% prior to injection molding. This produced Injection molded ASTM D638 standard tensile bars and flexural specimens for further mechanical test and degradation test. For injection molding PET composites, the barrel temperatures 232° C. to 263° C., and mold temperature 100° C. were used. For Injection molding PEN composites, the barrel temperatures 268° C. to 280° C., and mold temperature 175° C. were used.

The PET and PEN composites were injection molded into tensile and flexural specimens using a Toyo Plaster machine. The molding conditions (shown in Table 7) including the zone temperature, screw recovery speed, and back pressure, were optimized to make consistent and high-quality parts. Additionally, multiple runs were performed before collecting samples to attain further consistency. 40 tensile and flexural samples were collected for the majority of materials, for a few PET composites which turned out to be too weak to process, only 5-10 specimens were obtained.

TABLE 7

Processing conditions of the injection molding.

| Parameters | PET Composites | PEN Composites |
|---|---|---|
| barrel temp (F) | 450-505 | 515-535 |
| mold temp (F) | 110 | 175 |
| injection speed | 70% | 50% |
| pack pressure (Psi) | 500 | 500-850 |
| pack time (sec) | 5 | 6-8 |
| screw recovery | 60% | 60% |
| Back Pressure (Psi) | 60 | 60 |

1.3 Testing and Characterization 1.3.1

Tensile tests were conducted on the injection molded tensile bars using the MTS QTest/50LP equipped with a 2 in extensometer. Five random samples were taken and measured following the ISO 527 method. The sample width and thickness in the waisted area and the testing speed are shown in Table 8. All of the obtained tensile test data are listed in the appendix for samples before degradation and after degradation (degradation details described later).

TABLE 8

Tensile Test Methodology.

| Gage Length | Width | Thickness | Speed |
|---|---|---|---|
| 136 mm | 12.5 mm | 3.1 mm | 10 mm/min |

1.3.2 Degradation Testing
Degradation Testing—Flexural Bars

To examine the degradability of these materials, degradation tests were performed on the PET and PEN composites using high-pressure autoclaves (500 ml, OFITE-Style Aging Cells). For such tests, 3-5 injection molded flexural bars of each material were cut into half (6-10 specimens) and placed inside the autoclaves. To prevent overlay of the specimens, a home-made stainless-steel sample holder was inserted into the autoclaves to hold and align the specimens. The specimens were numbered with a permanent marker, weighed, measured for its thickness and length. An aqueous solution of 0.3 wt % Potassium Chloride (KCl) in HPLC grade water was used to fill the autoclaves, about 400-450 ml solution in each. The pH of the solution was also measured. Then, the autoclaves were sealed with rubber gaskets under 40 psi nitrogen gas. Note that a light amount of 'anti-seize' gel was added to both the threads of the autoclaves and the gaskets, and the quality of the seal was checked with hand-soap solutions right after sealing. The autoclaves were placed into ovens (VWR Oven Gr Con 3.7 CF and VWR 1360 Oven.) at various temperatures (120, 150° C.) for times up to 3 weeks. Then, the autoclave was removed, cooled down, opened, and one to two specimens were removed at rough interval of 1, 2, 4, 7, 10, 14, and 21, days of testing.

When the specimen was removed, its weight, thickness, length and width were recorded. Then, it was vacuum dried at 202 F for 24 h, and all of sample parameters were measured again. PH value of the solution was also measured using a digital pH meter and monitored with the degradation.

Degradation Testing—Tensile

To study the effects of the degradation on the mechanical properties of samples, tensile of degraded samples were monitored after periods of degradation. Due to the fact that the injection molded tensile bars are slightly longer to be fitted inside the autoclaves. A small piece of material about % inch long was cut from both ends of the tensile bars. Afterwards, 5 of such shortened tensile bars were placed inside autoclaves for tensile testing specimens, respectively. The submerging solution was again 0.3 wt % KCl in HPLC grade water, with 400 to 450 ml solution in each autoclave. Another set of stainless-steel sample holder was used to align the tensile bars. At each time interval, one to two specimens were taken out, paper towel dried, and then tested either with ISO 527 method for tensile test described above. Note that we have found that the shortened tensile bars did not change properties compared to the standard tensile bars. Also, although degraded parts barely changed the dimension, the averaged original sample geometries were used for both the tensile and the compression tests. Note that, sometimes, the specimens are too fragile to be tested; the results session only plot the data generated successfully.

1.3.5 SEM with Energy Dispersive X-Ray Spectroscopy

Energy dispersive X-ray spectroscopy (EDS) of PET, PET/CaO, and PET/CaO/Ca(OH)$_2$ composites were characterized with affiliations of a scanning electron microscopy (SU1510, Hitachi, Japan). The cross sections of samples were observed after cutting into granules.

2. Results and Discussion 2.1

Stability during Melt Processing PET/CaO or PET/CaO/Ca(OH)$_2$ composites with varied CaO or PET/CaO/Ca(OH)$_2$ loading from about 5% to about 40% (weight percentage) were prepared by melt mixing.

2.1.1 Mechanical Properties of PET/CaO or PET/CaO/Ca(OH)$_2$ Composites

From performance point of view, mechanical properties can serve as a direct indicator for the thermal stability of PET/CaO or PET/CaO/Ca(OH)$_2$ during melt processing. If severely degraded during melt processing, the material should have reduced mechanical properties, particularly low tensile strength.

Overall, the composite materials with CaO loading up to 40% are all quite resilient and can sustain a large strain before tensile fracture. The tensile testing results are summarized in Table 9. It can be seen that, even at 40% loading of CaO, a failure strain close to 10% can still be obtained. Compared with the original PET polymer, the PET/CaO composite materials do not show a large compromise in mechanical properties, especially with low to medium loading of CaO. In fact, at 25% loading of CaO, the tensile strength is even slightly higher than that of the virgin PET. There could be multiple reasons for this improvement, e.g., possible crosslinking of PET by CaO and moisture scavenger due to CaO.

TABLE 9

| | Prior Art Mechanical Properties | |
| --- | --- | --- |
| Formula in CaO Content (%) | Tensile Strength (MPa) | Strain at break (%) |
| 0 | 51 | 18 |
| 10 | 45 | 26 |
| 25 | 57 | 23 |
| 40 | 35 | 8.3 |
| 50 | 23 | 0.3 |

Overall, the composite materials with CaO loading up to 40% are all quite resilient and can sustain a large strain before tensile fracture. The tensile testing results are summarized in Table 9. It can be seen that, even at 40% loading of CaO, a failure strain close to 10% can still be obtained. Compared with the original PET polymer, the PET/CaO composite materials do not show a large compromise in mechanical properties, especially with low to medium loading of CaO. In fact, at 25% loading of CaO, the tensile strength is even slightly higher than that of the virgin PET. There could be multiple reasons for this improvement, e.g., possible crosslinking of PET by CaO and moisture scavenger due to CaO.

Figure 3:
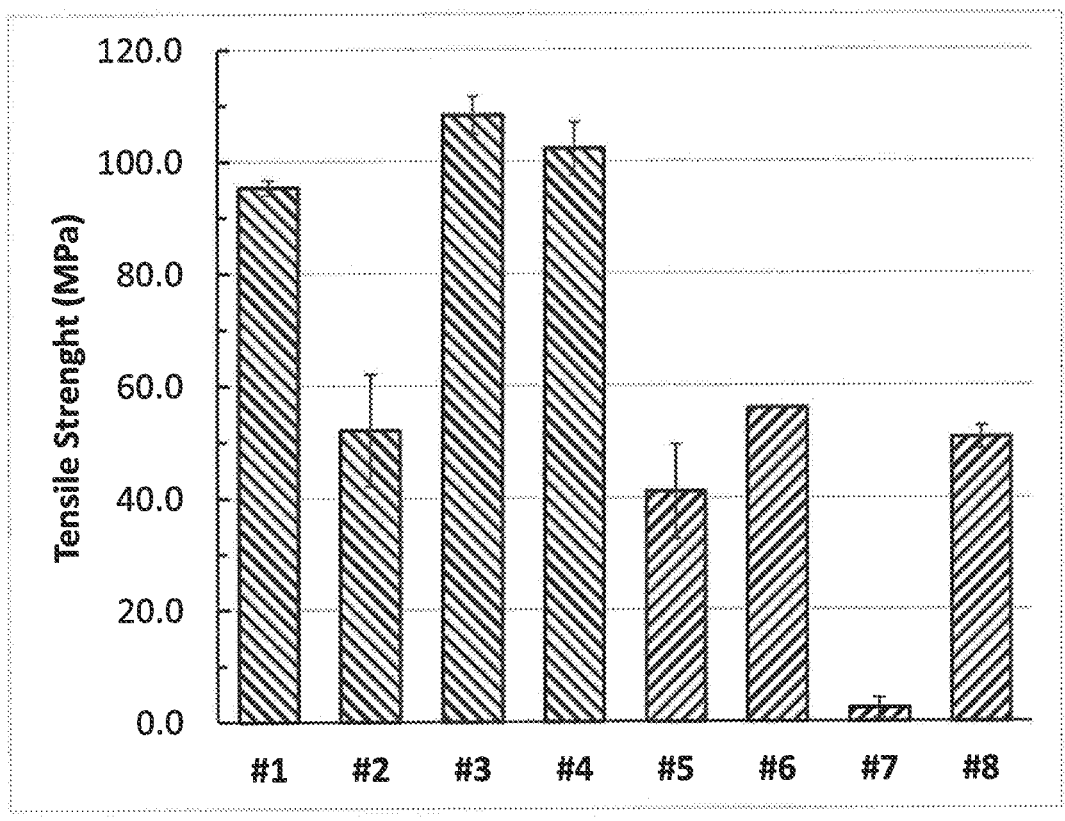
FIG. 3 shows tensile strength of PET composites with glass fiber, CaO, and $Ca(OH)_2$ at various compositions.

The averaged tensile strength of PET composites with glass fiber, CaO, and Ca(OH)$_2$ at various compositions is shown in FIG. 3. The error bars in the plots indicate the standard deviation obtained from 5 specimens. The solids and stripe bars represent the glass-filled and non-glass filled composites, respectively. Overall, except the PET/GF/CaO/Ca(OH)$_2$ 60/30/0/10 composite which might have degraded during the compounding and molding, the composites with 30% glass fiber exhibit higher tensile strength than those without glass fiber. In fact, the PET composite with 30% glass fiber and with CaO/Ca(OH)$_2$ ratios of 10/10, 15/5, 5/5 show relatively similar tensile strength ranging from 95 to 108 MPa. The tensile strength of the composites without glass fiber ranges from 6000 to 8000 psi, except the PET/GF/CaO/Ca(OH)$_2$ 90/0/0/10 with only 2.4 MPa. Note that regardless of whether it is glass filled or not, the two composites without CaO but with 10% Ca(OH)$_2$ show the lowest tensile strength in their group, which indicates that the polymer degraded and CaO if added actually helps to reduce the degradation as seen with other composites. DSC measurements were performed on several of the PET composites particularly PET/GF/CaO/Ca(OH)$_2$ 90/0/0/10. However, no obvious difference is observed in the melting and the melting enthalpy of the PET component in these composites.

PEN Composites

Figure 4:
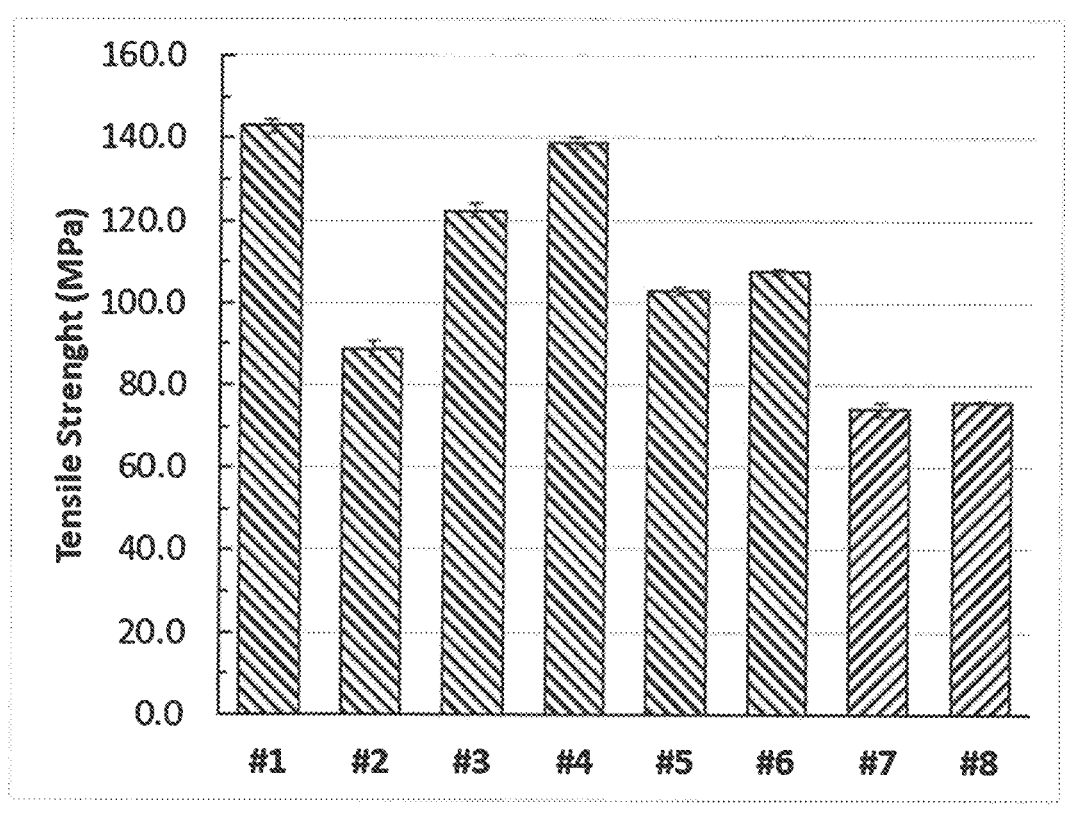
FIG. 4 shows tensile strength of PEN composites with glass fiber, CaO, and $Ca(OH)_2$ at various compositions.

The averaged tensile strength of PEN composites with glass fiber, CaO, and Ca(OH)$_2$ at various compositions is plotted in FIG. 4. Similar to PET composites, overall, the glass filled PEN composites (solid bars) show higher tensile strength than those of non-glass filled ones (stripe bars). Within the glass-filled composites, the PEN/GF/CaO/Ca(OH)$_2$ 60/30/0/10 has the lowest strength, presumably due to the degradation of the polymer matrix with only Ca(OH)$_2$ added. The highest two are the PEN/GF/CaO/Ca(OH)$_2$ 70/30/0/0 and PEN/GF/CaO/Ca(OH)$_2$ 60/30/5/5, showing a tensile strength around 139 to 142 MPa. The two non-glass filled composites, PEN/GF/CaO/Ca(OH)$_2$ 90/0/0/10 and PEN/GF/CaO/Ca(OH)$_2$ 80/0/10/10 exhibit tensile strength of 74.1 MPa and 75.7 MPa, respectively. The slightly weaker strength of PEN/GF/CaO/Ca(OH)$_2$ 90/0/0/10 is primarily due to the non-presence of CaO but only with Ca(OH)$_2$. Regardless, the PEN composites show higher overall tensile strength than the corresponding PET composites described above. This could be due to the stronger PEN matrix than PET, and possible less degradation during compounding and molding process.

PET Composites Degradation at 90° C.

Figure 5:
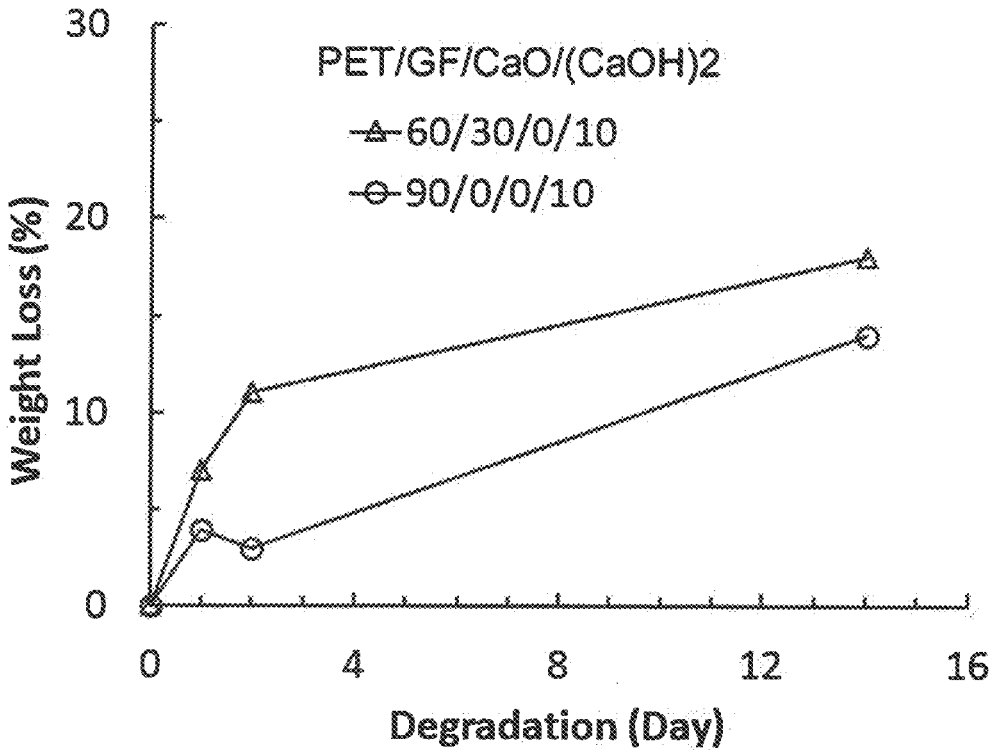
FIG. 5 shows the weight loss percentage of the PET/GF/CaO/Ca(OH)$_2$ 60/30/0/10 and PET/GF/CaO/Ca(OH)$_2$ 90/0/0/10—samples degraded at 90° C.
Figure 6:
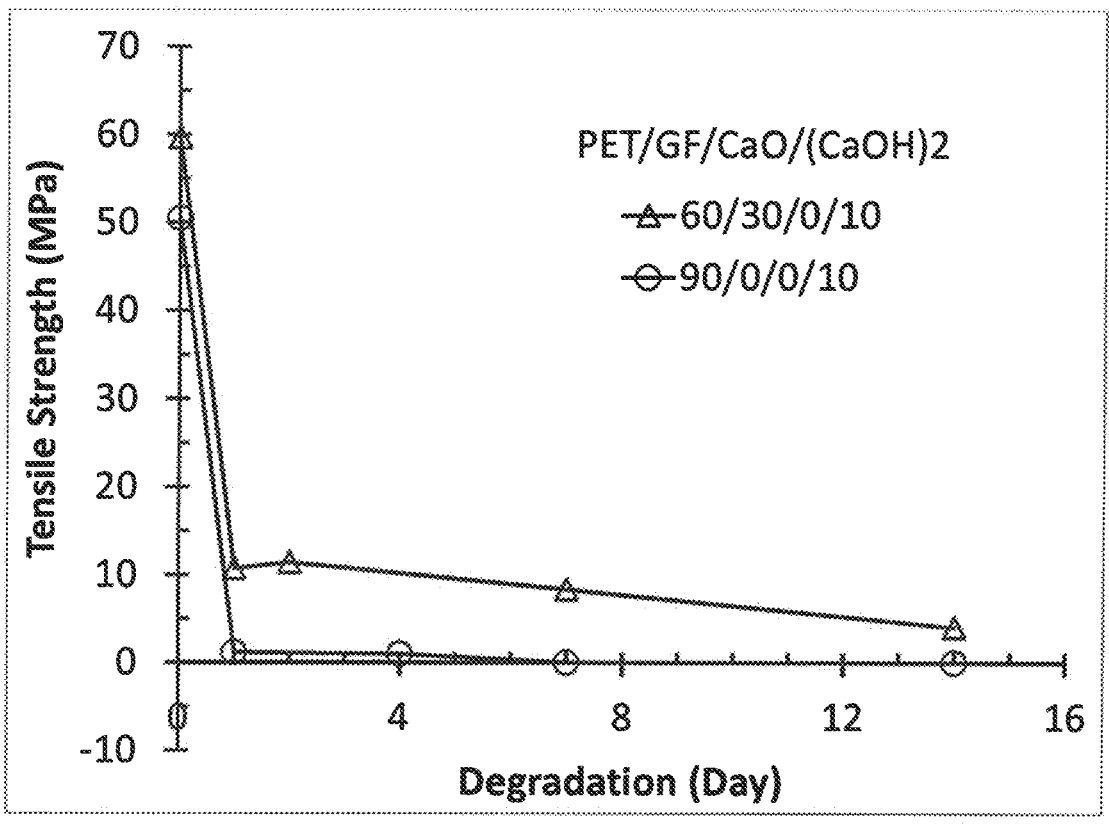
FIG. 6 shows tensile strength changes of the PET/GF/CaO/Ca(OH)$_2$ 60/30/0/10 and PET/GF/CaO/Ca(OH)$_2$ 90/0/0/10 samples degraded at 90° C.

Degradation at 90° C. is conducted for two PET composites without CaO, PET/GF/CaO/Ca(OH)$_2$ 60/30/0/10 and PET/GF/CaO/Ca(OH)$_2$ 90/0/0/10. Note that composite PET/GF/CaO/Ca(OH)$_2$ 60/30/0/10 shows low tensile strength 52.1 MPa, where composite PET/GF/CaO/Ca(OH)$_2$ 90/0/0/10 shows very low tensile strength only 2.4 MPa. as described earlier. The results collected are shown in FIGS. 5-6, for the weight loss, and the tensile strength, respectively. Both composites lose more weight with prolonging the degradation (FIG. 5). At 14 day, the PET/GF/CaO/Ca(OH)$_2$ 60/30/0/10 and PET/GF/CaO/Ca(OH)$_2$ 90/0/0/10 materials lose weight up to 18% and 14%, respectively. The results are slightly different than some of the composites degraded at 120° C., where reduced weight loss is observed with the long degradation. Therefore, if there is some reaction occurring between the inorganic pieces and the environment, such reaction is reduced at the lower degradation temperature. Accompanying with the weight loss, tensile strength decreases with the time of degradation. After one day degradation, the PET/GF/CaO/Ca(OH)$_2$ 60/30/0/10 and PET/GF/CaO/Ca(OH)$_2$ 90/0/0/10 samples only have 9.6 MPa and 1.0 MPa tensile strength retained, and the strength keeps decreasing with increasing the degradation. The PET/GF/CaO/Ca(OH)$_2$ 60/30/0/10 samples broke into pieces after being tested, as expected. However, the degraded PET/GF/CaO/Ca(OH)$_2$ 90/0/0/10 cannot even be tested with tensile test, presumably due to its weak strength (broken or delaminated during drying). Such results are consistent with the sandpaper scratch results where the sample without glass fibers break into pieces upon scratch, after they have degraded for 7 or 14 days.

From the data characterizations of the hydrolysis product, we may deduce the following reaction scheme for the aqueous degradation:

$$\text{PET} + \text{Ca(OH)}_2 \rightarrow \text{CaTPA} + \text{Ethylene Glycol} \qquad \text{(Equation 1)}$$

Such a reaction is anticipated when PET is under hydrolysis with the presence of calcium hydroxide. This reaction is known in the literature. However, the novelty of the current work is to use this reaction in the formation of an aqueously degradable PET composite material where a latent reagent (CaO and Ca(OH)$_2$) is pre-impregnated into the PET matrix. This pre-impregnation also does not negatively impact the mechanical properties and melt processability of the composite material so that realistic applications may be developed from such a material formulation.

PEN Composites Degradation at 150° C.

Figure 7:
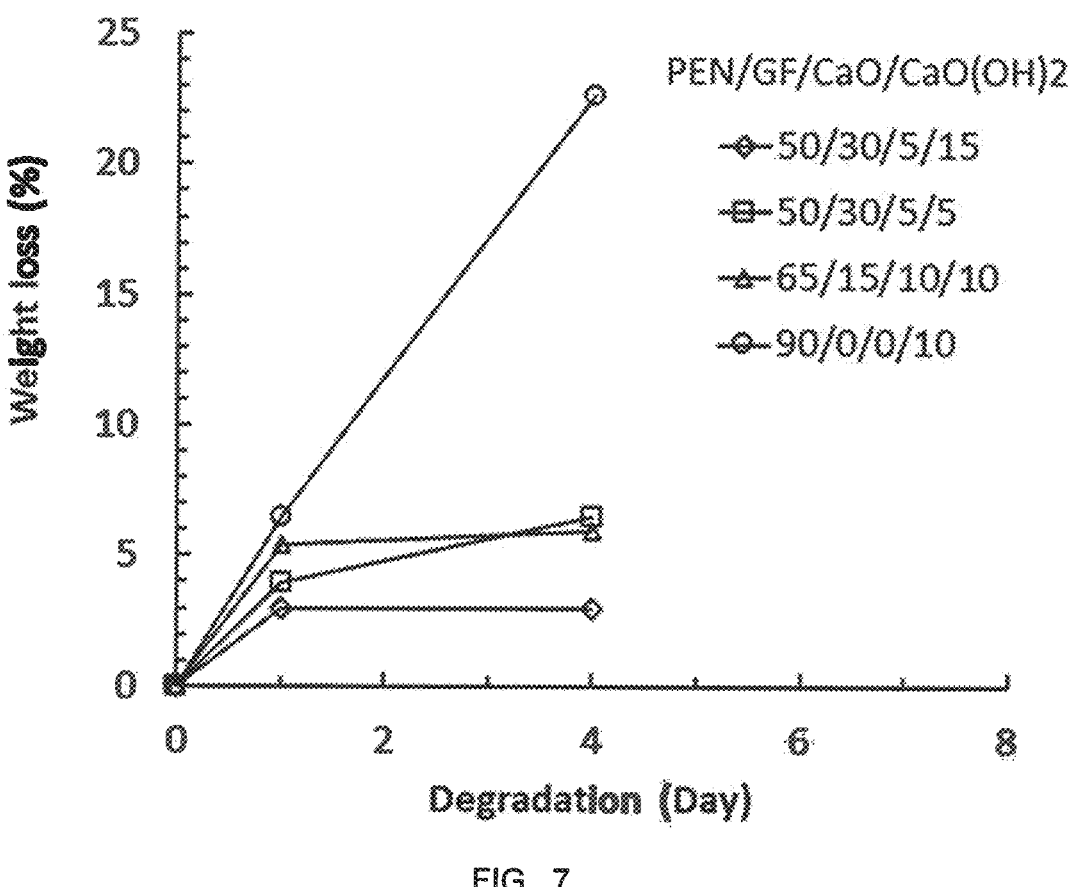
FIG. 7 shows weight loss percentage of the PEN/GF/CaO/Ca(OH)$_2$ 50/30/5/15, PEN/GF/CaO/Ca(OH)$_2$ 60/30/5/5, PEN/GF/CaO/Ca(OH)$_2$ 65/15/10/10, and PEN/GF/CaO/Ca(OH)$_2$ 90/0/0/10 samples degraded at 150° C.
Figure 8:
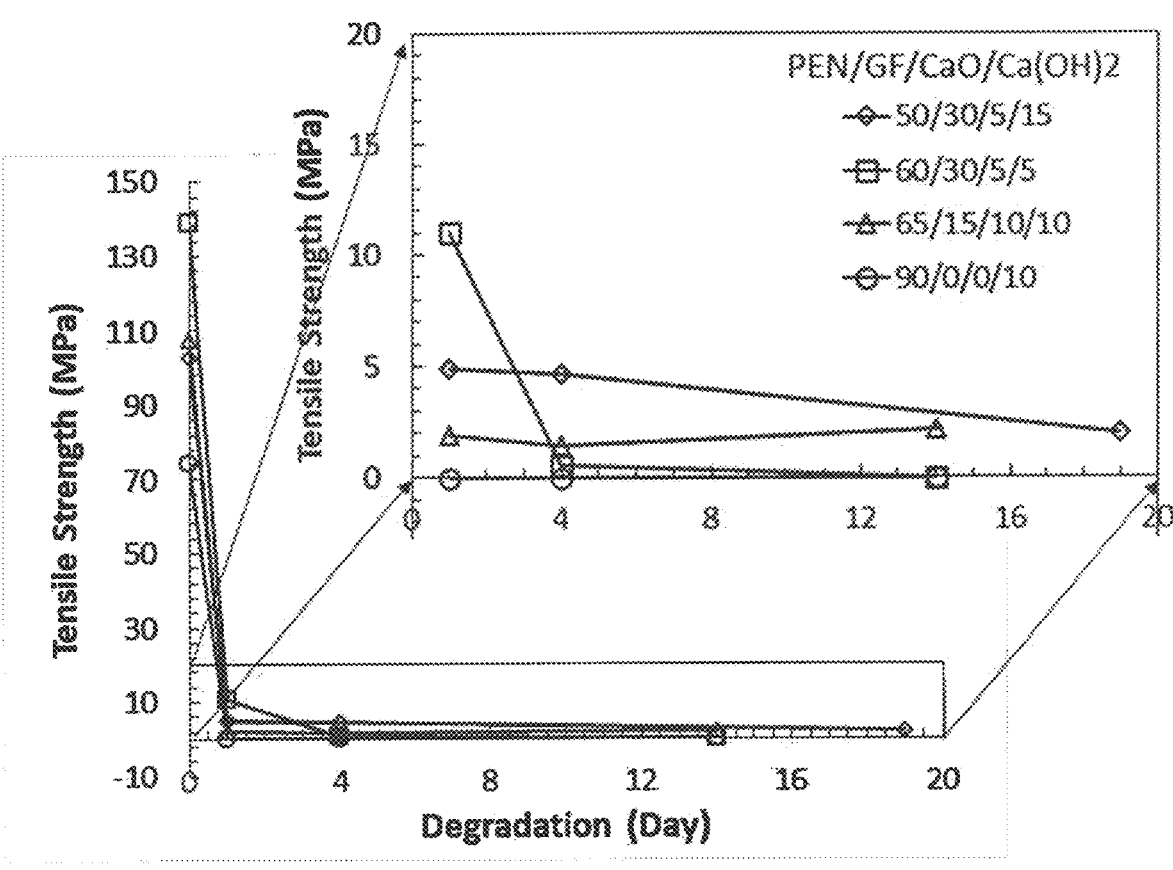
FIG. 8 shows tensile strength changes of the PEN/GF/CaO/Ca(OH)$_2$ 50/30/5/15, PEN/GF/CaO/Ca(OH)$_2$ 60/30/5/5, PEN/GF/CaO/Ca(OH)$_2$ 65/15/10/10, and PEN/GF/CaO/Ca(OH)$_2$ 90/0/0/10 samples degraded at 150° C.

Degradation study of PEN composites were performed at slightly higher temperature of 150° C., due to its higher thermal transitions. The weight loss data are shown in FIG. 7. The PEN/GF/CaO/Ca(OH)$_2$ 90/0/0/10 sample has the largest weight loss, up to 23% after 4 days degradation; the other three composites loses less, with 3% to 7% weight loss after 4 days degradation. Along with the weight loss, the tensile strength decreases, as shown in FIG. 8. Note that, first of all, all of the samples show a high tensile strength before degradation, between 74 MPa and 143 MPa. After 1 day degradation, the strength reduces to 11 MPa for PEN/GF/CaO/Ca(OH)$_2$ 60/30/5/5, 4.9 MPa for PEN/GF/CaO/Ca(OH)$_2$ 50/30/5/15, 2 MPa for PEN/GF/CaO/Ca(OH)$_2$ 65/15/

10/10. The composite, PEN/GF/CaO/Ca(OH)$_2$ 90/0/0/10, which does not contain glass fiber, delaminates even after 1 day degradation in the autoclave. After 19 day degradation, the tensile specimen of PEN/GF/CaO/Ca(OH)$_2$ 60/30/5/5 also broke into pieces even inside the autoclave. The evolution of the tensile strength is in agreement with what found with the sandpaper scratch test. After 19 day degradation, both the sandpaper scratch sample and the tensile specimen of the PEN/GF/CaO/Ca(OH)$_2$ 60/30/5/5 and PEN/GF/CaO/Ca(OH)$_2$ 90/0/0110 composites break into pieces in the autoclaves although the other two composites' specimens remain intact. So far, the PEN/GF/CaO/Ca(OH)$_2$ 60/30/5/5 material shows the most promising characteristics, with a 139 MPa tensile strength to start with and with a strong disintegrate ability upon degradation. More degradation studies are conducted to examine the degradation behavior of other PEN composites to gain more information of the polymer system.

Figure 9:
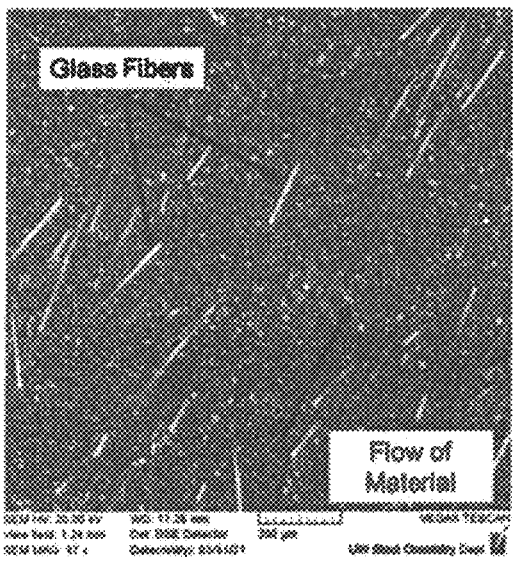
FIG. 9 shows SEM images of PET/GF/CaO/Ca(OH)$_2$ 60/30/5/5 composite before and after degradation at 120° C. for 18 days.
Figure 9:
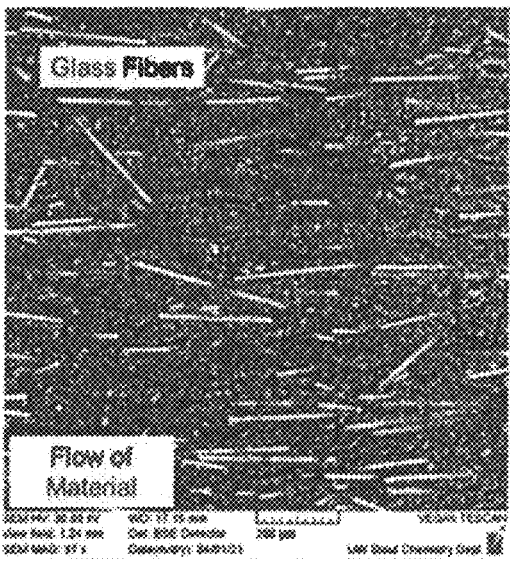
Figure 10:
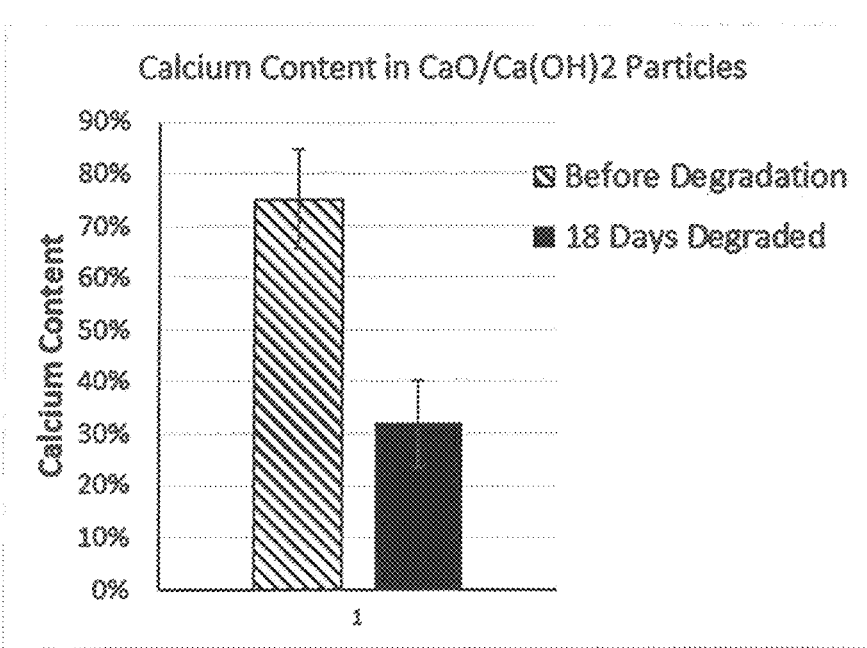
FIG. 10 shows calcium concentration in the CaO/Ca(OH)$_2$ particles in the PET/GF/CaO/Ca(OH)$_2$ 60/30/5/5 composite before and after degradation at 120° C. for 18 days.

In order to learn more about the system, SEM images (FIG. 9) were collected on the samples before and after degradation. Before degradation the glass fibers have an averaged diameter of 15 micrometer and an average length of 140 micrometer. After degradation, the diameter is roughly the same, 15 micrometer, but the length is 170 micrometer. The data indicate that short fibers might fall out during the degradation and/or might have reacted and been broken out slightly. EDX analysis was performed on these images, and the calcium concentrations in the CaO/Ca(OH)$_2$ particles were determined in the samples before and after degradation. As shown in FIG. 10, after degradation, the calcium content in these particles decreases. The results confirm the presence of some Calcium was dissolved out during the degradation.

We claim:

1. A degradable composite, comprising:
   about 20-70% by weight of polyester, wherein the polyester comprises polyethylene terephthalate (PET) or polyethylene naphthalate (PEN);
   about 4-30% by weight of calcium oxide and calcium hydroxide, wherein the calcium oxide is present in an amount of about 2-25% by weight of the composite and the calcium hydroxide is present in an amount of about 2-15% by weight of the composite, and
   about 1-50% by weight of fiber, wherein the composite has a tensile strength of at least about 90 MPa.

2. The degradable composite according to claim 1, wherein the polyester is about 30-60% by weight of the composite, and wherein the calcium oxide is about 5-20% by weight of the composite and the calcium hydroxide is about 2-10% by weight of the composite.

3. The degradable composite according to claim 1, wherein the calcium oxide is about 10-15% 2-25% of the composites.

4. The degradable composite according to claim 1, wherein the calcium hydroxide is about 2-15% of the composites, and wherein the calcium oxide is about 2-25% of the composite.

5. The degradable composite according to claim 1, wherein the fiber is about 10-50% of the composites, and wherein the fiber is glass fiber having an average diameter of about 10-20 micrometers.

*   *   *   *   *